July 22, 1969 W. G. BEGUE 3,456,703
EGG-CRACKING APPLIANCE
Filed June 12, 1967 3 Sheets-Sheet 1
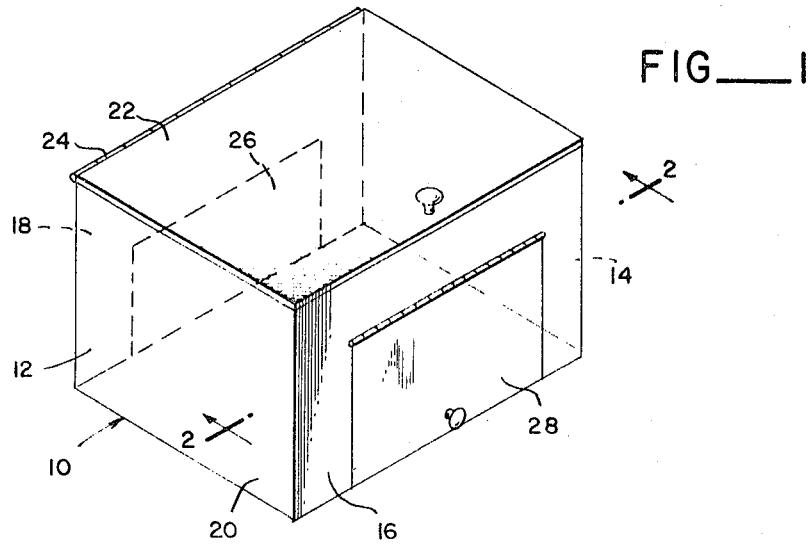
FIG__1
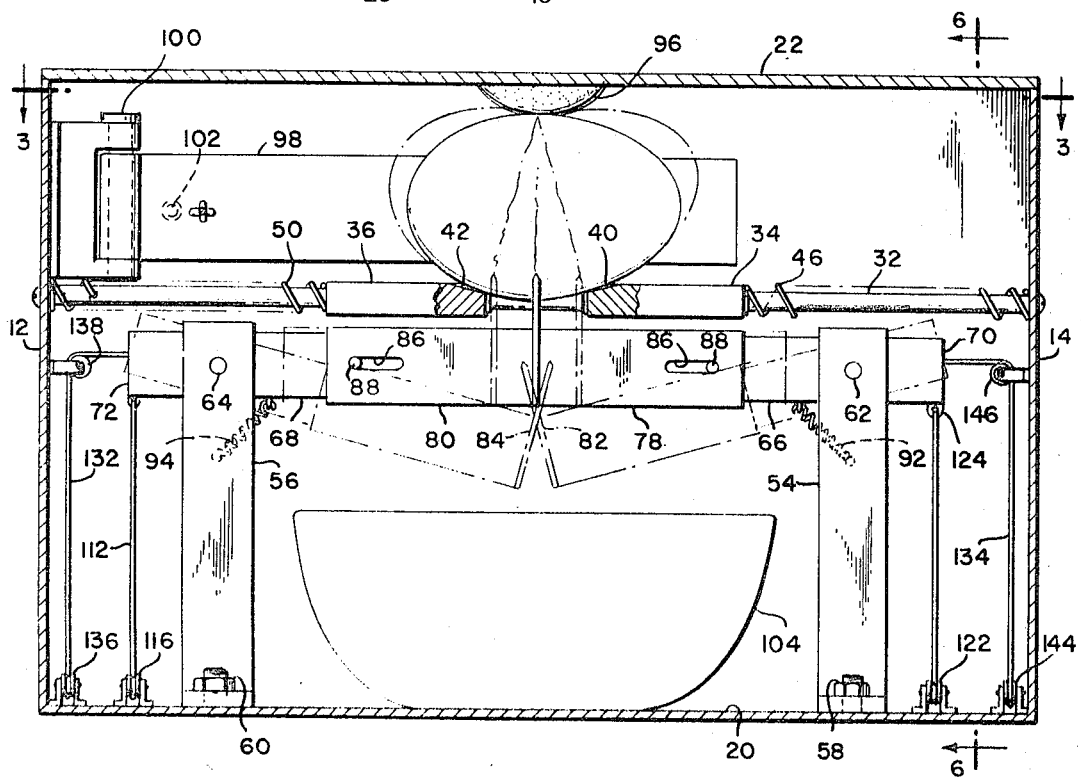
FIG__2
WILLIAM G. BEGUE
INVENTOR.
BY
Fraybeal, Cole & Barnard
ATTORNEYS July 22, 1969        W. G. BEGUE        3,456,703
EGG-CRACKING APPLIANCE
Filed June 12, 1967        3 Sheets-Sheet 2
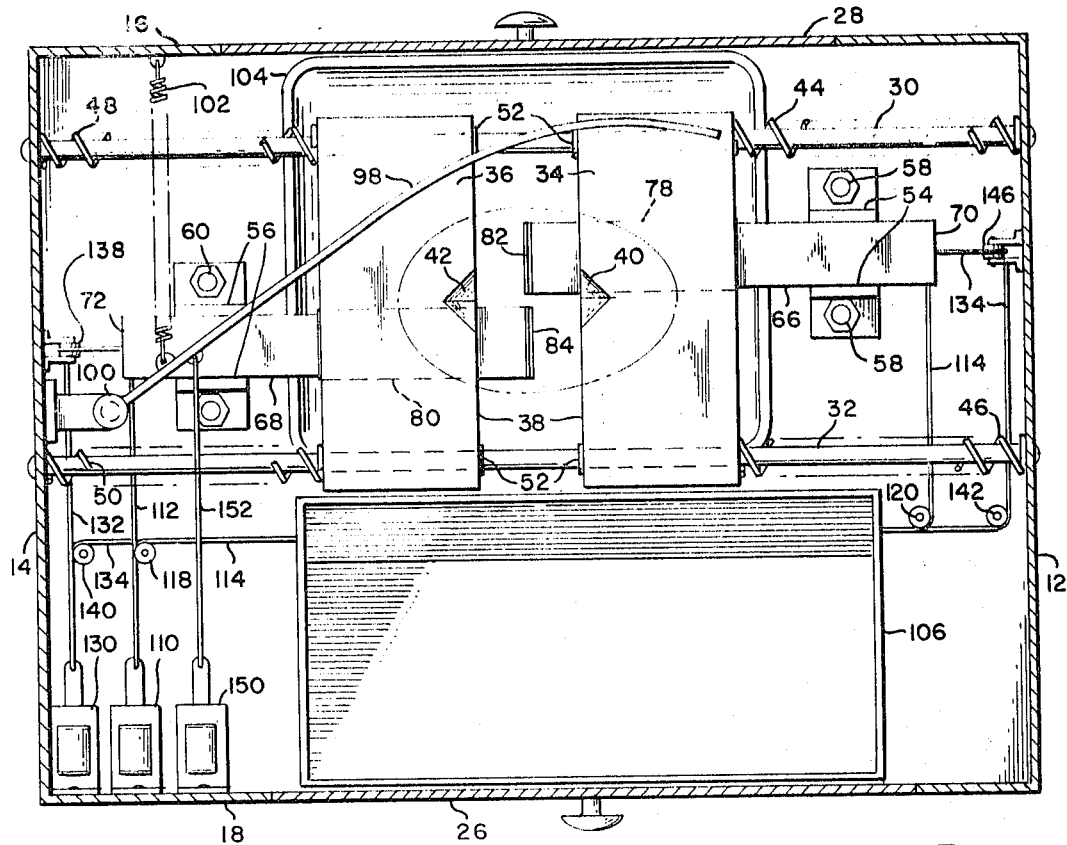
FIG__3
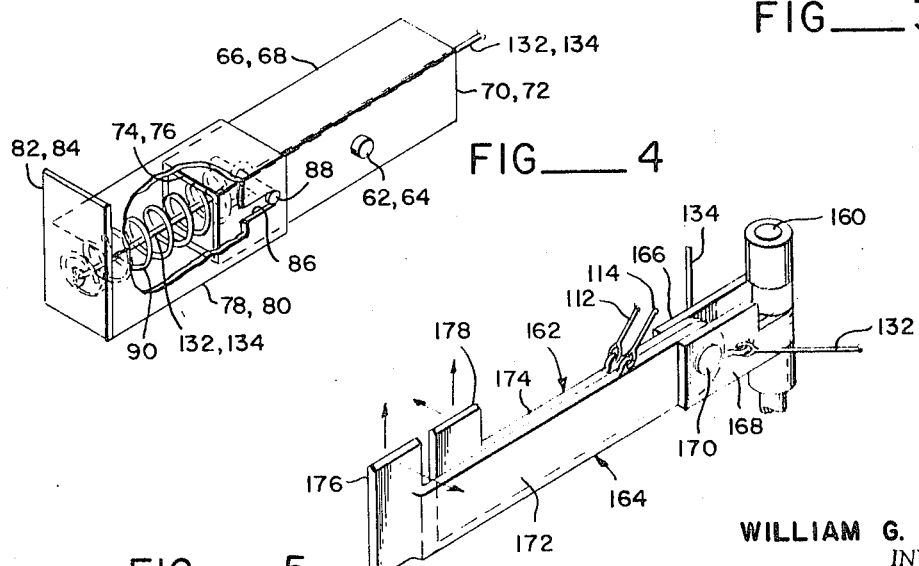
FIG__4
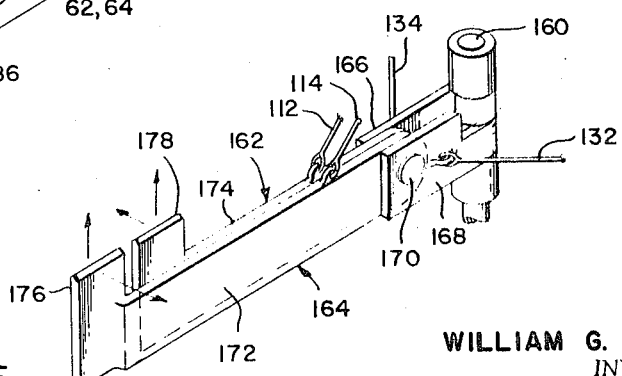
FIG__5
WILLIAM G. BEGUE
INVENTOR.
BY
*Graybeal, Cole & Barnard*
ATTORNEYS July 22, 1969 W. G. BEGUE 3,456,703
EGG-CRACKING APPLIANCE
Filed June 12, 1967 3 Sheets-Sheet 3
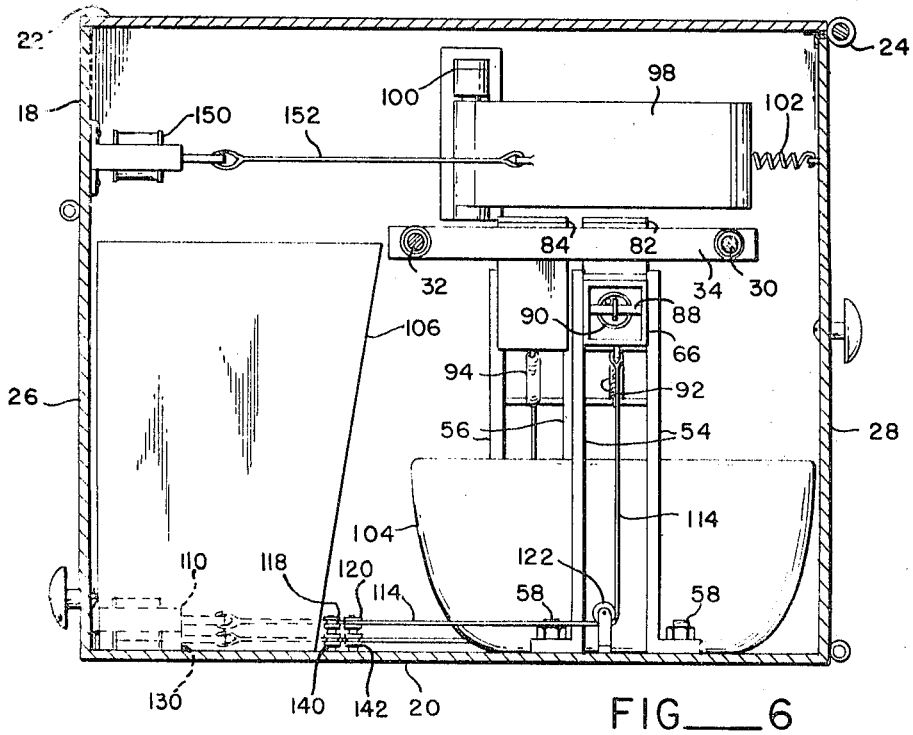
FIG__6
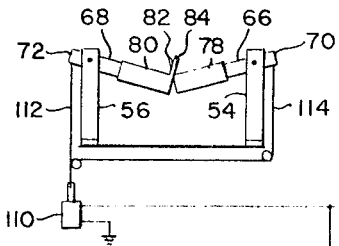
FIG__7
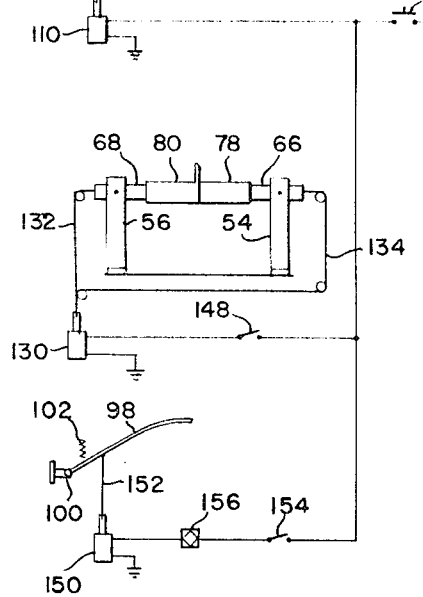
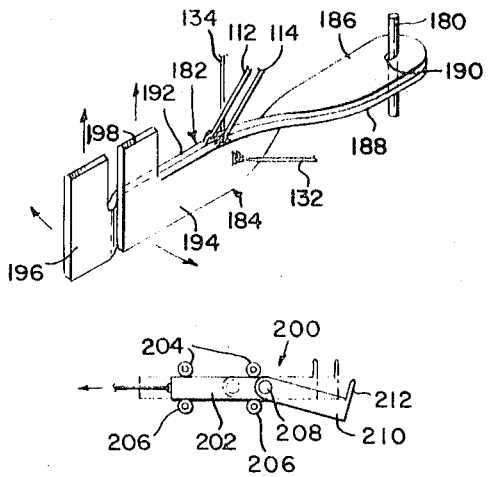
FIG__8
FIG__9
INVENTOR.
WILLIAM G. BEGUE
BY
Graybeal, Cole & Barnard
ATTORNEYS United States Patent Office 3,456,703
Patented July 22, 1969

3,456,703
EGG-CRACKING APPLIANCE
William G. Begue, 715 12th Ave. E.,
Seattle, Wash. 98102
Filed June 12, 1967, Ser. No. 645,424
Int. Cl. A47j 43/14
U.S. Cl. 146—2       12 Claims

ABSTRACT OF THE DISCLOSURE

Egg-cracking apparatus having cradling members for receiving the egg in its uncracked form in which said cradling members are spaced apart at the center portion of the egg and the egg has light hold-down pressure applied on the top side thereof. Pivotal arms are located under the cradling members with shell-cracking blade members. The blades on the ends of the arms swing upwardly to crack the egg on on a generally common line and then are pulled apart to separate the two halves of the cracked egg. A bowl is located under the arms to receive the white and yolk of the egg while a sweep arm located above the cradling arms brushes the egg shell fragments or halves into a shell container. The upward pivotal movement of the arms, the pulling apart of the blades to separate shell halves, and the movement of sweep arm are actuated by solenoids in such a way that the sequence of steps allows sufficient time for the white and yolk of the egg to drop out of the shell before the sweep arm brushes the shell off the cradle members. The various elements of this egg-cracking device are housed within an appropriate and attractive container having top access so that eggs can be conveniently placed on the cradling members and including front and back access allowing both the bowl containing yolks and whites and the shell container to be conveniently removed from the housing. The cradling members are supported on rod members extending between the side walls of the housing. The under side of the housing cover or lid is provided with a soft or resilient material for engaging the top of the egg.

BACKGROUND OF THE INVENTION

Numerous attempts have been made to automate the breaking of eggs so that the whites and yolks thereof can be separated from the shell rapidly and without need of manual labor. Commercial interests using large quantities of eggs have employed numerous types of egg-cracking devices. However, heretofore known machines have been unnecessarily complicated and expensive. The operation of present machines results in an unacceptable egg breakage rate and a loss of efficiency in shell drainage. While numerous efforts have been made to automate the cracking and separation of eggs for commerce and industry, so far as is known, little if any work has been directed to the provision of an egg-cracking machine designed primarily for household use as a small attractively packaged appliance for the modern kitchen.

Prior art patents directed to egg-cracking devices of one type or another are: White, No. 1,397,306; Young et al., No. 2,031,294; Amon, No. 2,076,440; Gill, No. 2,655,965; Willsey, No. 2,771,926; Shelton et al., No. 3,111,150; Shelton et al., No. 3,133,569; and Twedt et al., No. 3,190,328.

SUMMARY OF INVENTION

The apparatus of this invention has as one of its primary objectives the provision of an egg-cracking machine which is structurally simple and economically inexpensive. It contemplates a small housing or container for convenient shelf storage or unobtrusive counter use. The simplicity and compactness of the device are considered to make it particularly suitable for the household. The invention embraces an outer housing having a top lid and a covered opening at both the front and the rear thereof. Within the housing are two spaced apart, and generally horizontally disposed, cradle members which hold the egg. On the under surface of the lid is a small resilient or soft egg engaging means so that the egg is held gently but firmly in its cradle position. Since the cradle members are spaced apart the center portion of the egg overlies the space. Beneath the cradle members are disposed arms each of which swings upwardly. On the inner ends of the arms are vertically disposed blade members which extend up into the opening and crack the egg when the arms are swung upwardly. The blade members are attached to a portion of the arm which is slidable or movable relative to the arm. The blade members after they have engaged the egg are then pulled apart to separate the shell halves. The egg white and yolk then fall out of the egg, through the space, past the arms and into a bowl disposed directly below the cradle space. Above the cradle members and below the hold-down member on the undersurface of the lid is a sweep arm for wiping the shell halves off the cradle and into a container to one side thereof. Movements of the blade arms and sweep arm are accomplished by solenoids.

It is therefore among the many features of this invention to provide an automatic egg-breaking machine in which the yolk and white are removed and the shell discarded with minimum effort. It is another feature to furnish an egg-breaking machine which is suitable from both size and economy standpoints for home use as a small appliance. It is a further feature to furnish an egg-cracking machine in which the cycling time per egg is very brief and yet which handles the egg gently so that the yolk is removed intact and so that the egg shell is efficiently drained.

BRIEF DESCRIPTION OF THE DRAWING

FIG. 1 is a view in perspective showing that the housing for the elements of this invention may be a simple rectangular box structure;

FIG. 2 is an elevational cross section view taken along the line 2—2 of FIG. 1 to show details of the egg-cracking mechanism;

FIG. 3 is a top plan view in cross section taken along the line 3—3 of FIG. 2 further illustrating the details of the device and to further clarify placement of various parts;

FIG. 4 is a partial view in perspective, with portions broken away, of the egg-cracking arm and the shell engaging blade thereon;

FIG. 5 is an alternative embodiment of the egg-cracking arms exemplified in FIG. 4;

FIG. 6 is an end elevational view in cross section taken along the line 6—6 of FIG. 2 illustrating additional details and placement and location of parts;

FIG. 7 is a schematic diagram showing circuitry for actuation of moving parts;

FIG. 8 is another alternative embodiment of the shell-cracking and separating arms which may be used in this invention; and FIG. 9 is a still further alternative embodiment of the type of arm which may be used with the invention.

DESCRIPTION OF PREFERRED EMBODIMENT

In the drawings it will be seen that the housing, generally designated by the number 10, has side walls 12 and 14, front wall 16 and rear wall 18. Container 10 also has bottom wall 20 and lid 22 pivotally secured by hinge 24. Rear wall 18 has an opening closed by hinged door 26 and front wall 16 has an opening covered by hinged door 28.

Extending between side walls 12 and 14 are a pair of spaced apart generally parallel and horizontally disposed rods 30 and 32. As can be seen, rods 30 and 32 are located generally at the front portion of the container. The rods have supported thereon generally rectangularly shaped cradle members 34 and 36. While it is preferred that cradle members 34 and 36 remain stationary in a spaced apart position to define spacing or opening 38, such cradle members should be movable on the rods if desired. The cradles may have notches or recesses 40 and 42 to help position the egg. Compression springs 44, 46, 48 and 50 bias the cradle members against stops 52 in order to retain them in stationary position. Spacing 38 can vary as desired. If the cradles are set closer together it may be found necessary to move them outwardly with the blades which will be described more fully hereinafter. It has been found preferable, however, to space the cradle members far enough apart so that they do not have to be moved.

Located beneath the rods and cradle members are pairs of generally upstanding arm support members 54 and 56. As can be seen, such pairs of supports are spaced apart and generally parallel and extend from bottom or floor 20 where they are anchored as by bolts 58 and 60, upwardly to a point spaced slightly below rods 30 and 32. It will be observed that arm supports 54 and 56 are situated near end walls 12 and 14. It will also be seen, particularly by reference to FIGS. 3 and 6, that the support pairs 54 and 56 are offset from each other for reasons to be explained more fully hereinafter. Pivotally located at the upper ends of the support pairs as on pins or pivots 62 and 64 are tubular pivot arm sections 66 and 68. It will be seen that arm pivot sections 66 and 68 extend from outside the supports, that is between the side walls and said supports, toward the spacing 38 between the cradle members. Thus tubular members 66 and 68 have outer ends 70 and 72 and inner ends 74, 76 (see FIG. 4). Movably or telescopically received on the inner ends of arm pivot sections 66 and 68 are slidable are sections 78 and 80, received on corresponding pivot sections 66 and 68 but which also extend outwardly beyond said inner ends. At the outer ends of slidable arm portions 78 and 80 are the upwardly extending shell-cracking or engaging blades 82 and 84. Blades 82 and 84 extend upwardly above the upper surface of the slidable arm portion and generally fall into alignment in the raised position as shown particularly in FIGS. 2 and 3. In other words, the two blades 82 and 84 define generally a straight line across the small dimension of the egg.

Since the construction of each arm is the same, the elements therein will be described by a single number. Each of the slidable arm portions has aligned slots 86 on both sides receiving the ends of a pin 88 extending horizontally through pivotal arm portions 66 and 68. A compression spring 90 abuts the inner surface of blades 82 and 84 and extends through the movable or slidable arm portion into the inner end of the pivotal arm portion and is received on pin 88. In this manner, the slidable arm portions 78 and 80 are forced outwardly by spring action. Slots 86 and guide pins 88 prevent the arms from being separated as well as limiting the distance which each slidable arm portion will travel on its respective pivotal arm portion. However, the cradle members could be used to establish the distance which the slidable arm portions will move. Springs 92 and 94 are interconnected between the pivotal arm sections 66 and 68 and the support pairs to bias the arms downwardly into their inoperative and unused position.

When the arms are pivoted upwardly about pins 62 and 64, the engaging edges of blades 82 and 84 pass upwardly through spacing 38 between the cradle members, to engage, penetrate, and crack the shell. At this point the arms are generally as shown in solid lines in FIG. 2. The slidable arm portions 78 and 80 are then withdrawn or moved outwardly so each blade moves a half of the egg shell.

Centered above the cradle members 34 and 36 on the under side of lid 22 is a soft or resilient hold-down member 96 for gently engaging the top of the egg. Above the cradle members and their supporting rods is a sweep arm 98 hingedly secured as at 100 to one side of housing 10. Said sweep arm 98 is biased to an inoperative position by spring 102. A bowl 104 is positioned below the cradle members and between the support pairs to receive white and yolk dropping from the shell. A shell container 106 is located towards the rear wall 18 of the housing in such a way that its inside edge is close to the cradle members. Thus when sweep arm 98 is actuated it swings over the cradle members and pushes the egg shell into container 106.

Actuation of the various elements is accomplished by solenoids. For instance, upward movement of the arm portions 66 and 68 is accomplished by solenoid 110, shown in FIG. 3. Solenoid 110 has connected thereto a pair of flexible wires or lines 112 and 114. Wire 112 extends from the solenoid to pulley 116 and then upwardly to connect to outer end 72 of pivotal arm section 68. The other wire or line 114 extends around pulley 118, pulley 120 and then upwardly around pulley 122 to the outer end of pivotal arm section 66 as at 124. When solenoid 110 is energized the outer ends of pivotal arm sections 66 and 68 are swung downwardly and the inner ends thereof swung upwardly to bring blades 82 and 84 into contact with the egg. Closing of the circuit to actuate solenoid 110 is accomplished by a simple switch mechanism connected to lid or cover 26 which closes a switch 126 or by a depressible start button on the housing. As soon as pivotal arm sections 66 and 68 have been swung upwardly and the egg cracked, then a second solenoid 130 is actuated to draw the slidable arm portions 78 and 80 apart on their respective pivot arm portions. Solenoid 130 has a line 132 leading to slidable or movable arm portion 80 and a flexible wire or line 134 leading to slidable or movable arm portion 78. Line 132 is directed outwardly to pulley 136, upwardly to pulley 138 and thence into the outer end 72 of arm 68 to extend to the inside surface of blade 84. In like manner, line 134 leads from solenoid 130 around pulley 140, pulley 142, pulley 144, pulley 146 and thence through pivotal arm section 66 and movable arm portion 78 to the inside surface of blade 82. In this way, as soon as the egg has been cracked, blades 82 and 84 may be withdrawn or parted to separate the egg shell halves. A switch 148 energizes solenoid 130 when it is closed by the pivot arms 66 and 68 reaching their uppermost operative position or by the core of solenoid 110 reaching its full "in" position. Sweep arm 98 is actuated by solenoid 150 connetced to such arm by flexible wire or other appropriate line 152. Solenoid 150 is energized by the closure of switch 154 when the core of solenoid 130 has reached its full retracted position. When switch 154 is closed a time delay 156 in the circuit withholds actuation of the solenoid 150 by about 3 to 5 seconds allowing sufficient time for the white and yolk of the egg to drain from the shell. Then the sweep arm is swung across the cradle members and the egg shells are swept off into container 106. When the core of solenoid 150 reaches its full retracted position it actuates a stop button which opens the main switch 126 to cut power from the circuit. Spring 102 then draws the sweep arm back into operative position and springs 92 and 94 drop arms 66 and 68. The apparatus is then ready to receive another egg. It should be mentioned that switch 126 may be closed either by the lid 122 or by a separate start button.

FIG. 5 shows an alternative shell breaking and separating arm structure which may be incorporated with the invention. A generally vertically disposed primary pivot 160 is located to one side of cradle members 34 and 36. To the pivot will be connected separately movable arm structures generally designated by the numbers 162 and 164. Connected for pivotal movement about the vertical pivot on arm 162 is inner section 166 and on arm 164 inner section 168. The two inner sections 166 and 168 are capable of being moved apart around pivot 160. At the outer end of inner sections 166 and 168 is a pivot pin 170 for arm 164 and a similar pivot pin (not shown) for arm 162. An outer arm section 172 is pivotally connected to inner arm section 168 on arm 164 and an outer arm section 174 pivotally connected to the outer end of inner section 166 on arm 162 by pivot pins 170. Outer section 172 of arm 164 has blade 176 and outer arm section 174 has blade 178. The arms are formed so that the shell engaging edges of blades 176 and 178 are aligned as in the preferred embodiment. Lines 112 and 114 can be used to swing the outer arm sections upwardly to crack the egg and wires 132 and 134 can be attached to swing the arms apart to separate the shell halves.

FIG. 8 is a variation of the arm embodiment shown in FIG. 5. Like FIG. 5, this particular arm structure extends inwardly from one side of the cradle member rather than from the ends as shown in the preferred embodiment. Again a vertical pivot means 180 is located in a normal position to one side generally in alignment with the center of spacing 38. A pair of arms generally designated by the numbers 182 and 184 are mounted on said pivot means 180. Each arm has a generally horizontally disposed section for connection to pivot 180. Arm 182 has horizontal section 186 and arm 184 has horizontal section 188. The horizontal sections have slightly off-round holes 190 to receive pivot or pin 180. Very slight elongation of holes 190 permits a limited swinging of the arms through or in a vertical plane. The arms then have vertically disposed sections 192 and 194 which may be twist formed as shown or attached to the horizontal sections by some other method. Arm 182 is slightly longer than arm 184 having at the outer end thereof blade 196 while arm 184 is shorter and has at the outer end thereof blade 198. The longer arm is offset so that the blades of the two arms may be aligned as described in other embodiments. Wires or lines 112 and 114 can be employed to swing the arms upwardly to crack the shell while wires 132 and 134 can be used to separate the arms to draw the egg shell halves apart.

FIG. 9 shows another alternative embodiment for the shell breaking and separating arms. This form of arm structure will operate from the ends of the cradles as in FIG. 1 except that the motion is different and only one actuating wire or line per arm is required. The arm, of which there will be two, is generally designated by the number 200 and has a generally horizontally slidable or movable section 202 supported between generally horizontally disposed rollers or guide means. The rollers or guide means, the upper of which are shown as numbers 204 and the lower of which are shown as numbers 206, are generally horizontally spaced apart to accommodate the outer arm section 202 therebetween. Pivotally connected as at 208 is an inner arm section 210 having blade 212. When outer arm section 202 is drawn outwardly, the inner arm section 210 is also pulled and by action of the guides 204 and 206 functioning on the edges thereof like a cam swings upwardly to crack the egg. Motion applied to the outer section 202 is such that each blade 212 not only cracks the egg shell but also draws a half thereof with it. The movement of the blades 212 is compound but has an advantage in that only one actuation wire or line per arm is required.

The support pairs 54 and 56 for the arms may be single piece elements, as those skilled in the art will readily recognize, which will include brackets or other means for mounting said arms. The lines leading from the solenoids to actuate the moving parts may be flexible wire, string, nylon thread, or the like. Also the movable arm portions 78 and 80 need not have the slots and guide pins as shown since the spring 90 inside would prevent such portions from sliding off the pivotal sections 66 and 68. The inner end of spring 90 will however have to be anchored to means located in sections 66 and 68 such as an abutment wall or pin located therein. The movable arms and blades have been shown as offset to establish a generally straight line when the blades are in their full up position. However, it will be appreciated that the arms could be set to pivot in the same plane, with the blades coming together when the arms are pivoted upwardly. In this way a straight line cracking will still result.

From the foregoing, further variations, modifications, adaptations and usages of the apparatus according to the present invention will be apparent, within the scope of the following claims.

What is claimed is:
1. An egg breaking device, comprising:
 (a) a pair of egg-cradling members for holding a whole egg, said cradling members being spaced apart a predetermined distance to define an opening therebetween disposed under the center portion of said egg;
 (b) at least one and no more than two egg cracking blade members located beneath said cradling members and adapted to move upwardly into said opening to crack the shell of said egg and then to move toward a cradling member to separate the shell halves and permit the yolk and white to fall through said opening into a bowl;
 (c) removable hold-down means for engaging the top of said egg and cooperating with said cradling members to hold the shell thereof; and
 (d) sweep means located above said cradling members to brush the shell off said cradling members.

2. An egg breaking device according to claim 1 and in which said egg cradling members are relatively stationary.

3. An egg breaking device according to claim 1 and in which said blade members are disposed in such a way on coacting movable arms that said blades engage the shell of said egg generally along a straight line.

4. An egg breaking device according to claim 3, wherein said opening is of such dimensions that said blade members are able to move apart thus to separate portions of the shell.

5. An egg breaking device, comprising:
 (a) a pair of egg-cradling members for holding a whole egg, said cradling members being spaced apart a predetermined distance to define an opening therebetween extending under the short axis of said egg;
 (b) a pair of egg cracking blade members located beneath said cradling members and adapted to move upwardly together into said opening to crack the shell of said egg and then to move apart each toward a cradling member to separate the shell halves and permit the yolk and white to fall through said opening into a bowl;
 (c) resilient hold-down means for engaging the top of said egg and cooperating with said cradling members to hold said egg shell therebetween; and
 (d) sweep means located above said cradling members to brush the shell into a container located to one side of said cradling members.

6. An egg breaking device according to claim 5 and in which said egg cradling members are relatively stationary.

7. An egg breaking device according to claim 5, and in which said blade members are disposed in such a way on coacting movable arms that said blades engage the shell of said egg generally along a straight line.

8. An egg breaking device according to claim 7 wherein said opening is of such dimensions that said blade members are able to move apart thus to separate portions of the shell.

9. An egg breaking device, comprising:

(a) a pair of egg-cradling members for holding a whole egg, said cradling members being spaced apart a predetermined distance to define an opening therebetween extending under the short axis of said said egg;

(b) a pair of egg cracking blade members supported on movable arms located beneath said cradling members, said arms being adapted to move upwardly thrusting said blade members into said opening to crack the shell of said egg, at least portions of said arms having the blade members thereon then moving apart each toward a cradling member to separate the shell halves and permit the yolk and white to fall through said opening into a bowl;

(c) resilient hold-down means for engaging the top of said egg and cooperating with said cradling members to hold said egg shell therebetween; and (d) sweep means located above said cradling members to brush the shell from said cradling members.

10. An egg breaking device according to claim 9 and in which said egg cradling members are relatively stationary.

11. An egg breaking device according to claim 9 and in which said blade members are disposed in such a way on coacting movable arms that said blades engage the shell of said egg generally along a straight line.

12. An egg breaking device according to claim 11 wherein said opening is of such dimensions that said blade members are able to move apart thus to separate portions of the shell.

References Cited

UNITED STATES PATENTS

| | | | |
|---|---|---|---|
| 2,465,176 | 3/1949 | Serbu | 146—2 |
| 2,706,507 | 4/1955 | Bartell | 146—2 |
| 2,993,521 | 7/1961 | Palmer | 146—2 |

W. GRAYDON ABERCROMBIE, Primary Examiner